United States Patent
Harz et al.

(10) Patent No.: US 7,135,067 B2
(45) Date of Patent: Nov. 14, 2006

(54) WATER-BASED PIGMENT DISPERSIONS, THE PRODUCTION THEREOF AND THE USE OF THE SAME

(75) Inventors: Andreas Harz, Schwalbach (DE); Lothar Wihan, Rheinfelden (DE); Martin Alexander Winter, Kelkheim (DE); Andreas Pfrengle, Bingen (DE)

(73) Assignee: Clariant GmbH, Frankfurt (DE)

( * ) Notice: Subject to any disclaimer, the term of this patent is extended or adjusted under 35 U.S.C. 154(b) by 0 days.

(21) Appl. No.: 10/483,133

(22) PCT Filed: Jun. 29, 2002

(86) PCT No.: PCT/EP02/07201

§ 371 (c)(1), (2), (4) Date: Oct. 29, 2004

(87) PCT Pub. No.: WO03/006556

PCT Pub. Date: Jan. 23, 2003

(65) Prior Publication Data

US 2005/0075415 A1 Apr. 7, 2005

(30) Foreign Application Priority Data

Jul. 11, 2001 (DE) ................................ 101 33 641

(51) Int. Cl.
*C09B 67/20* (2006.01)
*C09D 17/00* (2006.01)

(52) U.S. Cl. ...................... 106/499; 106/402; 106/412; 106/413; 106/414; 106/420; 106/447; 106/453; 106/460; 106/476; 106/479; 106/480; 106/493; 106/494; 106/495; 106/496; 106/497; 106/498

(58) Field of Classification Search ................ 106/493, 106/499, 31.09, 31.11, 31.86, 402, 412, 413, 106/414, 420, 447, 453, 460, 476, 479, 480, 106/494, 495, 496, 497, 498, 712; 162/162; 426/105, 262; 430/108.1; 501/32; 510/373, 510/419; 524/366
See application file for complete search history.

(56) References Cited

U.S. PATENT DOCUMENTS 5,855,662 A    1/1999  Brandj et al.
6,770,331 B1 * 8/2004  Mielke et al. ............. 427/496

FOREIGN PATENT DOCUMENTS

WO          WO 01/12728 A1 *  2/2001

OTHER PUBLICATIONS

English Abstract for JP 6166845; Jun. 14, 1994.
English Abstract for JP 2298516; Dec. 10, 1990.
English Abstract for JP 2000044862; Feb. 15, 2000.
English Abstract for JP 4314769; Nov. 5, 1992.
English Abstract for SU 1265227; Oct. 23, 1986.
U.S. Appl. No. 10/533,476, by Piastra et al., filed Apr. 29, 2005.
U.S. Appl. No. 10/553,817, by Schweikart et al., filed Oct. 19, 2005.

* cited by examiner

*Primary Examiner*—Anthony J. Green
(74) *Attorney, Agent, or Firm*—Anthony A. Bisulca

(57) ABSTRACT

The invention relates to a pigment dispersion consisting essentially of a) at least one organic or inorganic pigment or a combination of the same, b) an alpha-methyl--omega-hydroxy-polyethylene glycol ether having an average molar mass of between 250 and 1000 g/mol, c) standard dispersing agents for producing aqueous pigment dispersions, d) water, and e) optionally other standard additives.

14 Claims, No Drawings

WATER-BASED PIGMENT DISPERSIONS, THE PRODUCTION THEREOF AND THE USE OF THE SAME

The present invention relates to water-based pigment preparations, to processes for preparing them, to their use for the coloring primarily of emulsion paints, and to paints.

A great number of pigment dispersions are known for a wide variety of applications, comprising anionic and/or nonionic auxiliaries as dispersants. In general these auxiliaries are alkylaryl compounds, their alkoxylation products and/or their sulfonation products. These dispersants, which are suitable for dispersing solids in aqueous systems, are unable, however, in the presence of water as sole liquid medium, to finish a pigment in such a way that the finished preparation obtained fulfils all desired properties. For instance, during the dispersing operation and even thereafter, flocculation phenomena and sedimentation may occur, which lead to changes in the viscosity of the application medium, to changes in shade and losses of color strength, hiding power, gloss, homogeneity, brightness and also poorly reproducible shades, and to a tendency to run in the case where the materials colored include paints. There is also considerable detriment to the resistance to partial and complete drying-up. Conventional pigment preparations therefore include, alongside dispersants, wetting agents, thickeners, preservatives, viscosity stabilizers, and fillers, a retention agent, whose purpose is to ensure that the product does not dry up or even dry partly prior to use. Ethylene glycol or propylene glycol has generally been employed for this purpose. Reasons of environmental protection rule out the use, however, of volatile glycols such as propanediol, 1,2-monoethylene glycol or diethylene glycol.

As an alternative to ethylene glycol or propylene glycol EP 0 735 109 uses polyetherpolyols, which, although displaying very good results in terms of resistance to partial and complete drying-up, have significant deficiencies in their scuff resistance and abrasion resistance in the application medium.

The present invention is therefore based on the object of providing aqueous pigment preparations which exhibit good resistance to partial and complete drying-up, are ecotoxicologically unobjectionable, and possess a high scuff resistance and abrasion resistance in the application medium.

It has been found that an alpha-methyl-omega-hydroxy-polyethylene glycol ether retention agent achieves the object specified above.

The present invention provides a pigment dispersion consisting essentially of a) at least one organic or inorganic pigment or combination thereof,
b) an alpha-methyl-omega-hydroxy-polyethylene glycol ether having an average molar mass of from 250 to 1000 g/mol,
c) dispersants usual for the preparation of aqueous pigment dispersions,
d) water, and
e) if desired, further, customary additives.

Preferred pigment dispersions are those consisting essentially of a) from 10 to 80% by weight, in particular from 20 to 70% by weight, of at least one organic or inorganic pigment;
b) from 1 to 50% by weight, more preferably from 2 to 30% by weight, very preferably from 4 to 20% by weight, in particular from 5 to 10% by weight, of an alpha-methyl-omega-hydroxy-polyethylene glycol ether having an average molar mass of between 250 and 1000 g/mol, more preferably between 400 and 600 g/mol, in particular between 470 and 530 g/mol;
c) from 2 to 25% by weight, in particular from 3 to 15% by weight, of a usual dispersant
d) from 5 to 80% by weight, in particular from 10 to 60% by weight, of water;
e) from 0 to 5% by weight of customary additives, the percentages by weight being based in each case on the total weight of the pigment dispersion.

Examples of organic pigments for the purposes of the invention are monoazo pigments, disazo pigments, laked azo pigments, triphenylmethane pigments, thioindigo pigments, thiazineindigo pigments, perylene pigments, perinone pigments, anthanthrone pigments, diketopyrrolopyrrole pigments, dioxazine pigments, quinacridone pigments, phthalocyanine pigments, isoindolinone pigments, isoindoline pigments, benzimidazolone pigments, naphthol pigments, and quinophthalone pigments, and also acid to alkaline carbon blacks from the furnace black or gas black group.

Examples of suitable inorganic pigments are titanium dioxides, zinc sulfides, iron oxides, chromium oxides, ultramarine, nickel or chromium antimony titanium oxides, cobalt oxides, and bismuth vanadates.

Mention may also be made of dispersions comprising as solids, for example, finely divided ores, minerals, sparingly soluble or insoluble salts, particles of wax or polymer, crop protection products and pesticides, optical brighteners, and dyes.

The alpha-methyl-omega-hydroxy-polyethylene glycol ether used in accordance with the invention is preferably a compound of the formula (I)

$$H_3C\text{—}O\text{—}[\text{—}CH_2CH_2\text{—}O\text{—}]_m\text{—}H \qquad (I)$$

where m=9 to 35 (on average).

Preferred alpha-methyl-omega-hydroxy-polyethylene glycol ethers for the purposes of the present invention may also include fractions of nonmethylated polyglycol ether. Products of this kind are available commercially and have a hydroxyl number of from 50 to 200 mg/g, in particular from 106 to 119 mg/g, KOH (ASTM D4272-94d).

Compounds suitable as component c) include anionic, cationic, and nonionic surface-active compounds. Particularly well established are dispersants which possess one or more medium-chain or long-chain hydrocarbon chains. Of the multiplicity of compounds only a selection will be listed at this point, though without restricting the applicability of the compounds of the invention to these examples. Examples are alkyl sulfates, alkylsulfonates, alkyl phosphates and alkylbenzenesulfonates, such as lauryl sulfate, stearyl sulfate, dodecylsulfonates, octadecyl sulfates, dodecylsulfonates, condensation products of fatty acid and taurine or hydroxyethanesulfonic acid, alkoxylation products of alkylphenols, castor oil rosin esters, fatty alcohols, fatty amines, fatty acids, and fatty acid amides, reaction products of nonylphenol and relatively short-chain, substituted alkylphenols and also their polymeric derivatives, e.g., formaldehyde condensation products, and also polymeric compounds such as polyacrylates and their alkoxylates, for example.

Suitable customary additives include antisettling agents, wetting agents, preservatives, viscosity stabilizers, and additives which influence the rheology.

The invention also provides a process for preparing the pigment dispersions of the invention, which involves dispersing component (a) in powder, granule or aqueous presscake form in conventional manner in the presence of water and also of components (b) and (c), subsequently mixing in, where appropriate, water (d) and/or (e), and adjusting the resulting aqueous pigment dispersion with water to the desired concentration.

Preferably components (b), (c), (d), and (e) are mixed first of all, component (a) is stirred into the initial mixture, and the resulting mixture is dispersed, depending on the grain hardness of the pigments used, with stirrers, dissolvers, rotor-stator mills, ball mills, ball mills with stirring mechanisms such as sand mills and bead mills, high-speed mixers, kneading apparatus or high-performance bead mills.

The liquid to pastelike pigment preparations prepared in this way are suitable for coloring both natural and synthetic materials. They are notable for high flocculation stability and storage stability, color strength, gloss, homogeneity, brightness, and outstanding scuff resistance and abrasion resistance. They are particularly useful for pigmenting paints, including emulsion paints, dispersion varnishes, for printing inks, such as textile printing inks, flexographic or gravure inks, for wallpaper inks, for water-thinnable coating materials, for wood preservation systems, for viscose solution dyeing, for varnishes, for sausage casings, for seed, for glass bottles, for the mass coloring of roofing shingles, for plasters, for woodstains, for paper stocks, for colored pencil leads, felttip pens, artist's inks, pastes for ballpoint pens, chalks, detergents and cleaning products, shoecare products, coloring of latex products, abrasives and also for the coloring of plastics and high molecular mass materials.

The pigment dispersions of the invention are additionally suitable for use as colorants in electrophotographic toners and developers, such as one-component or two-component powder toners (also called one-component or two-component developers), magnetic toners, liquid toners, polymerization toners, and further specialty toners.

The pigment dispersions of the invention are additionally suitable for use as colorants in inkjet inks on both an aqueous and a nonaqueous basis, and also in inks which operate in accordance with the hot melt method or are based on microemulsions.

The pigment dispersions of the invention are miscible with water in any proportion and score over conventional pigment dispersions by outstanding flocculation stability and storage stability in numerous aqueous emulsion paints. Where additives compatible with hydrophobic paint binder systems are used to prepare the pigment dispersions, it is possible to produce dispersions which are stable to flocculation even in hydrophobic media. Particularly noteworthy are the good rheological properties and the excellent dispersibility in different application media.

In the examples which follow, parts denote parts by weight.

The scuff resistance and abrasion resistance was tested in accordance with DIN 53778 and DIN EN 13300 respectively:

The emulsion patent under test is applied to a Leneta sheet and dried. The dried sample coating is subjected to wet scuffing in a specific scuffing apparatus under defined conditions, with a scuffing brush which travels back and forth. When two tracks with a length of at least 10 cm, coherently, have been scuffed through down to the substrate, the test is ended and the scuff number (back-and-forth brush strokes) is recorded.

EXAMPLE 1

48 parts of C.I. Pigment Yellow 74, 8 parts of a polyphenol alkoxylate, 7.5 parts of alpha-methyl-omega-hydroxy-polyethylene glycol ether (Mv 470–530 g/mol), 0.6 part of preservative and 35.9 parts of demineralized water are ground at from 30 to 40° C. using a bead mill (from Drais) with 280 parts of zirconium oxide beads (d=1 mm). The grinding media are then separated off and the pigment preparation is isolated.

The pigment preparation has a high color strength with a very clean shade, is found to be highly fluid and stable on storage, that is, the sample remains highly fluid despite hot storage at 50° C. for 5 weeks.

An abrasion resistance of 900 back-and-forth brush strokes is achieved after 28 days' drying time; a preparation of the same pigment using propylene glycol instead of alpha-methyl-omega-hydroxy-polyethylene glycol ether shows an abrasion resistance of only 800 back-and-forth brush strokes after 28 days' drying time.

EXAMPLE 2

47 parts of C.I. Pigment Red 112, 10 parts of styrylphenyl ethoxylate, 7.5 parts of alpha-methyl-omega-hydroxy-polyethylene glycol ether (Mv 470–530 g/mol), 0.6 part of preservative and 34.9 parts of demineralized water are ground at from 30 to 40° C. using a bead mill (from Drais) with 280 parts of zirconium oxide beads (d=1 mm). The grinding media are then separated off and the pigment preparation is isolated.

The pigment preparation has a high color strength with a very clean shade, is found to be highly fluid and stable on storage; that is, the sample remains highly fluid despite hot storage at 50° C. for 5 weeks.

EXAMPLE 3

50 parts of C.I. Pigment Yellow 1, 8 parts of styrylphenyl ethoxylate, 7.5 parts of alpha-methyl-omega-hydroxy-polyethylene glycol ether (Mv 470-530 g/mol), 0.6 part of preservative and 33.9 parts of demineralized water are ground at from 30 to 40° C. using a bead mill (from Drais) with 280 parts of zirconium oxide beads (d=1 mm). The grinding media are then separated off and the pigment preparation is isolated.

The pigment preparation has a high color strength with a very clean shade, is found to be highly fluid and stable on storage; that is, the sample remains highly fluid despite hot storage at 50° C. for 5 weeks.

EXAMPLE 4

40 parts of C.I. Pigment Black 7, 8 parts of styrylphenyl ethoxylate, 3 parts of polyphenol alkoxylate, 7.5 parts of alpha-methyl-omega-hydroxy-polyethylene glycol ether (Mv 470–530 g/mol), 0.6 part of preservative and 40.9 parts of demineralized water are ground at from 30 to 40° C. using a bead mill (from Drais) with 280 parts of zirconium oxide beads (d=1 mm). The grinding media are then separated off and the pigment preparation is isolated.

The pigment preparation has a high color strength with a very clean shade, is found to be highly fluid and stable on storage; that is, the sample remains highly fluid-despite hot storage at 50° C. for 5 weeks.

EXAMPLE 5

45 parts of C.I. Pigment Blue 15:3, 13 parts of aryl polyglycol ether, 7.5 parts of alpha-methyl-omega-hydroxy-polyethylene glycol ether (Mv 47014 530 g/mol), 5 part of glycerol, 0.6 part of preservative and 28.9 parts of demineralized water are ground at from 30 to 40° C. using a bead mill (from Drais) with 280 parts of zirconium oxide beads (d=1 mm). The grinding media are then separated off and the pigment preparation is isolated.

The pigment preparation has a high color strength with a very clean shade, is found to be highly fluid and stable on storage; that is, the sample remains highly fluid despite hot storage at 50° C. for 5 weeks.

EXAMPLE 6

40 parts of C.I. Pigment Yellow 154, 8 parts of styrylphenyl ethoxylate, 3 parts of polyphenol alkoxylate, 7.5 parts of alpha-methyl-omega-hydroxy-polyethylene glycol ether (Mv 470–530 g/mol), 0.6 part of preservative and 40.9 parts of demineralized water are ground at from 30 to 40° C. using a bead mill (from Drais) with 280 parts of zirconium oxide beads (d=1 mm). The grinding media are then separated off and the pigment preparation is isolated.

The pigment preparation has a high color strength with a very clean shade, is found to be highly fluid and stable on storage; that is, the sample remains highly fluid despite hot storage at 50° C. for 5 weeks.

An abrasion resistance of 760 back-and-forth brush strokes is achieved after 28 days' drying time; in contrast, a preparation based on propylene glycol instead of alpha-methyl-omega-hydroxy-polyethylene glycol ether withstands only 710 back-and-forth brush strokes after 28 days' drying time.

What is claimed is:

1. A pigment dispersion consisting essentially of
   a) at least one organic or inorganic pigment or combination thereof,
   b) an alpha-methyl-omega-hydroxy-polyethylene glycol ether having an average molar mass of from 250 to 1000 g/mol,
   c) at least one dispersant,
   d) from 0 to 5% by weight of at least one additive, wherein the at least one additive is selected from the group consisting of antisetting agents, wetting agents, preservatives and viscosity stabilizers, and
   e) water, and wherein the pigment dispersion is ecotoxicologically unobjectionable.

2. A pigment dispersion as claimed in claim 1, consisting essentially of
   a) from 10 to 80% by weight of the at least one organic or inorganic pigment or combination thereof;
   b) from 1 to 50% by weight of the alpha-methyl-omega-hydroxy-polyethylene glycol ether having an average molar mass of between 250 and 1000 g/mol;
   c) from 2 to 25% by weight of the at least one dispersant,
   d) from 5 to 80% by weight of the water;
   e) from 0 to 5% by weight of the at least one additive, the percentages by weight being based in each case on the total weight of the pigment dispersion.

3. A pigment dispersion as claimed in claim 1, consisting essentially of
   a) from 20 to 70% by weight of the at least one organic or inorganic pigment or combination thereof;
   b) from 2 to 30% by weight of the alpha-methyl-omega-hydroxy-polyethylene glycol ether having an average molar mass of between 250 and 1000 g/mol;
   c) from 3 to 15% by weight of the at least one dispersant,
   d) from 10 to 60% by weight of the water;
   e) from 0 to 5% by weight of the at least one additive, the percentages by weight being based in each case on the total weight of the pigment dispersion.

4. A pigment dispersion as claimed in claim 3, comprising the alpha-methyl-omega-hydroxy-polyethylene glycol ether in an amount of from 4 to 20% by weight.

5. A pigment dispersion as claimed in claim 1, wherein the alpha-methyl-omega-hydroxy-polyethylene glycol ether has an average molar mass of between 400 and 600 g/mol.

6. A pigment dispersion as claimed in one claim 1, wherein the alpha-methyl-omega-hydroxy-polyethylene glycol ether has an average molar mass of between 470 and 530 g/mol.

7. A pigment dispersion as claimed in claim 1, wherein the organic pigment is a monoazo pigment, disazo pigment, laked azo pigment, triphenylmethane pigment, thioindigo pigment, thiazineindigo pigment, perylene pigment, perinone pigment, anthanthrone pigment, diketopyrrolopyrrole pigment, dioxazine pigment, quinacridone pigment, phthalocyanine pigment, isoindolinone pigment, isoindoline pigment, benzimidazolone pigment, naphthol pigment, and quinophthalone pigment, or an acidic to alkaline carbon black from the furnace black or gas black group.

8. A process for preparing a pigment dispersion as claimed in claim 1 comprising the step of dispersing component (a) in powder, granule or aqueous presscake form in the presence of water and of components (b) and (c) to form an aqueous pigment dispersion.

9. The process as claimed in claim 8, wherein the dispersing step further comprises adding at least one of water (d) and at least one additive (e).

10. The process as recited in claim 8, further comprising the step of diluting the aqueous pigment dispersion with water.

11. A pigment dispersion made in accordance with the process of claim 8.

12. A process for coloring a natural or synthetic material comprising the step of pigmenting the material with a pigment dispersion as claimed in claim 1.

13. The process as claimed in claim 12, wherein the material is selected from the group consisting of paints, emulsion paints, dispersion varnishes, printing inks, wallpaper inks, water-thinnable coating materials, sausage casings, seed, glass bottles, plasters, wood stains, paper stocks, colored pencil leads, felttip pens, artist's inks, pastes for ballpoint pens, chalks, detergents and cleaning products, shoecare products, latex products, abrasives, plastics, electrophotographic toners and developers, powder coating materials, and inkjet inks.

14. A pigmented natural or synthetic material made in accordance with the process of claim 12.

* * * * *